(12) United States Patent
Wu et al.

(10) Patent No.: US 9,459,338 B2
(45) Date of Patent: Oct. 4, 2016

(54) RELATIVE POSITION POSITIONING SYSTEM AND TRACKING SYSTEM

(71) Applicant: PixArt Imaging Inc., Hsinchu (TW)

(72) Inventors: Tsung-Ho Wu, Hsinchu (TW);
Shih-Wei Kuo, Hsinchu (TW);
Ching-Lin Chung, Hsinchu (TW)

(73) Assignee: PIXART IMAGING INC., Hsinchu (TW)

( * ) Notice: Subject to any disclaimer, the term of this patent is extended or adjusted under 35 U.S.C. 154(b) by 0 days.

(21) Appl. No.: 14/455,900

(22) Filed: Aug. 9, 2014

(65) Prior Publication Data
US 2015/0234032 A1 Aug. 20, 2015

(30) Foreign Application Priority Data

Feb. 18, 2014 (TW) .............................. 103105308 A

(51) Int. Cl.
*G01S 5/02* (2010.01)
*G06T 7/00* (2006.01)

(52) U.S. Cl.
CPC ............ *G01S 5/0289* (2013.01); *G01S 5/0263* (2013.01); *G01S 5/0294* (2013.01)

(58) Field of Classification Search
None
See application file for complete search history.

(56) References Cited

U.S. PATENT DOCUMENTS

| | | | | |
|---|---|---|---|---|
| 5,644,139 A * | 7/1997 | Allen | ..................... | H04N 1/047 250/557 |
| 6,038,502 A * | 3/2000 | Sudo | ..................... | G01S 13/931 180/167 |
| 7,860,273 B2 * | 12/2010 | Kochi | ..................... | G01C 11/00 348/218.1 |
| 8,423,289 B2 * | 4/2013 | Kagawa | ................ | G01S 5/0072 342/357.27 |
| 8,755,819 B1 * | 6/2014 | Kuscher | ................ | H04W 4/023 382/275 |
| 8,947,531 B2 * | 2/2015 | Fischer | .................... | G01S 7/003 348/148 |
| 2001/0055063 A1 * | 12/2001 | Nagai | ..................... | G01S 11/12 348/116 |
| 2002/0064300 A1 * | 5/2002 | Tevs | ........................ | G06T 7/206 382/107 |
| 2008/0143592 A1 * | 6/2008 | Terada | .................... | G01S 19/04 342/357.35 |
| 2008/0152216 A1 * | 6/2008 | Meadow | ........... | G06F 17/30241 382/154 |
| 2008/0253303 A1 * | 10/2008 | Stevens | ................... | H04L 41/12 370/254 |
| 2009/0265133 A1 * | 10/2009 | Baek | ...................... | G01S 5/0294 702/150 |
| 2011/0134781 A1 * | 6/2011 | Malnati | ................. | G01S 5/0072 370/252 |
| 2011/0160939 A1 * | 6/2011 | Mehlen | ................ | B64G 1/1085 701/13 |
| 2012/0062758 A1 * | 3/2012 | Devine | .................... | G01S 5/00 348/222.1 |

(Continued)

FOREIGN PATENT DOCUMENTS

| | | |
|---|---|---|
| CN | 102829796 A | 12/2012 |
| TW | M379762 U1 | 5/2010 |

(Continued)

*Primary Examiner* — Yonel Beaulieu
*Assistant Examiner* — Krishnan Ramesh
(74) *Attorney, Agent, or Firm* — Cheng-Ju Chiang

(57) ABSTRACT

A relative position positioning system includes a first apparatus and a second apparatus. Each one of the first and second apparatuses is configured to sense a relative position of the other in an initialization period. In an operation period, each one of the first and second apparatuses is configured to measure its own displacement relative to a plane, transmit its own measured displacement to the other through a wireless transmission unit, and update the relative position of the other according to its own displacement and the displacement received from the other.

11 Claims, 3 Drawing Sheets

(56) References Cited

U.S. PATENT DOCUMENTS

| | | | |
|---|---|---|---|
| 2012/0064971 A1* | 3/2012 | Devine | A63F 13/06 463/31 |
| 2013/0010617 A1* | 1/2013 | Chen | H04W 64/00 370/252 |
| 2013/0045795 A1 | 2/2013 | Fiedler | |
| 2013/0261949 A1* | 10/2013 | Eriksson | G05D 1/104 701/300 |
| 2013/0338868 A1* | 12/2013 | Essame | B60W 30/18163 701/23 |
| 2014/0005933 A1* | 1/2014 | Fong | G05D 1/0274 701/447 |
| 2014/0105054 A1* | 4/2014 | Sægrov | H01Q 3/2605 370/252 |
| 2014/0129126 A1* | 5/2014 | Richardson | G01S 19/51 701/300 |
| 2014/0172223 A1* | 6/2014 | Murphy | G05D 1/0289 701/25 |
| 2014/0210663 A1* | 7/2014 | Metzler | G01C 15/00 342/357.34 |
| 2015/0185025 A1* | 7/2015 | Lacaze | G08B 1/08 701/451 |
| 2015/0187087 A1* | 7/2015 | Lee | G06T 7/204 382/107 |

FOREIGN PATENT DOCUMENTS

| | | |
|---|---|---|
| TW | 201201525 A1 | 1/2012 |
| TW | 201328754 A1 | 7/2013 |
| TW | 201340755 A | 10/2013 |

\* cited by examiner

RELATIVE POSITION POSITIONING SYSTEM AND TRACKING SYSTEM

FIELD OF THE INVENTION

The present invention relates to a positioning system, and more particularly to a relative position positioning system. The present invention is also related to a tracking system.

BACKGROUND OF THE INVENTION

Unmanned ground vehicle is widely used in various fields due to it can replace human being to perform various high-risk military missions, such as explosives material processing or reconnaissance missions, or replace existing machine, such as lawn mower or unmanned cleaner, to perform daily routine works.

However, the existing unmanned ground vehicle is controlled through stand-alone manner; in other words, currently there is no such a system capable of simultaneously controlling more than one unmanned ground vehicles to perform a specific task. Thus, to develop this system, it is quite important to positioning these more than one unmanned ground vehicles.

SUMMARY OF THE INVENTION

An object of the present invention is to provide a relative position positioning system including at least two moving apparatuses and being capable of positioning each one of the moving or non-moving apparatuses therein.

Another object of the present invention is to provide a tracking system based on the aforementioned relative position positioning system.

The present invention provides a relative position positioning system, which includes a first apparatus and a second apparatus. Each one of the first and second apparatuses is configured to sense a relative position of the other in an initialization period. In an operation period, each one of the first and second apparatuses is configured to measure its own displacement relative to a plane, transmit its own measured displacement to the other through a wireless transmission mean, and update the relative position of the other according to its own displacement and the displacement received from the other.

The present invention further provides a relative position positioning system, which includes a first apparatus, a second apparatus and a third apparatus. Each one of the first, second and third apparatuses is configured to sense a relative position of the other two apparatuses in an initialization period. In an operation period, each one of the first, second and third apparatuses is configured to measure its own displacement relative to a plane; each one of the first and second apparatuses is configured to transmit its own measured displacement to the third apparatus through a wireless transmission mean and thereby the third apparatus is configured to transmit the displacements of the first, second and third apparatuses to the first and second apparatuses; and each one of the first, second and third apparatuses is configured to update the relative position of the other two apparatuses according to its own displacement and the displacements received from the other two apparatuses.

The present invention still further provides a tracking system, which includes a host machine, a first electronic device and a second electronic device. The first electronic device is initially located at a first determined position. The second electronic device is initially located at a second determined position. Both of the first and second first electronic devices are configured to transmit the first and second determined positions to the host machine through a wireless transmission mean, respectively, in an initialization period. In an operation period following the initialization period, each one of the first and second electronic devices is configured to measure its own displacement relative to a plane, transmit its own measured displacement to the host machine through the wireless transmission mean, and thereby the host machine is configured to dynamically display the positions of the first and second electronic devices according to the received displacements from the first and second electronic devices.

The present invention yet further provides a tracking system, which includes a mastery electronic device and a secondary electronic device. The mastery electronic device is disposed on a plane. The secondary electronic device is disposed on the plane and has a specific distance from the mastery electronic device. The mastery and secondary electronic devices are configured to communicate with each other through a wireless transmission mean in an initialization period. In an operation period following the initialization period, each one of the mastery and secondary electronic devices is configured to measure its own displacement relative to the plane, wherein the mastery and secondary electronic devices are configured to maintain the specific distance therebetween.

In summary, by first configuring all apparatuses in a relative position positioning system to sense the relative positions with each other and configuring each apparatus to measure its own displacement and then transmit the displacement to all the other apparatuses through a wireless transmission mean, each apparatus in the relative position positioning system of the present invention can obtain the relative position of all other apparatuses. In addition, based on the similar features, each electronic device in the tracking system of the present invention can obtain the relative position of all other electronic devices.

For making the above and other purposes, features and benefits become more readily apparent to those ordinarily skilled in the art, the preferred embodiments and the detailed descriptions with accompanying drawings will be put forward in the following descriptions.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
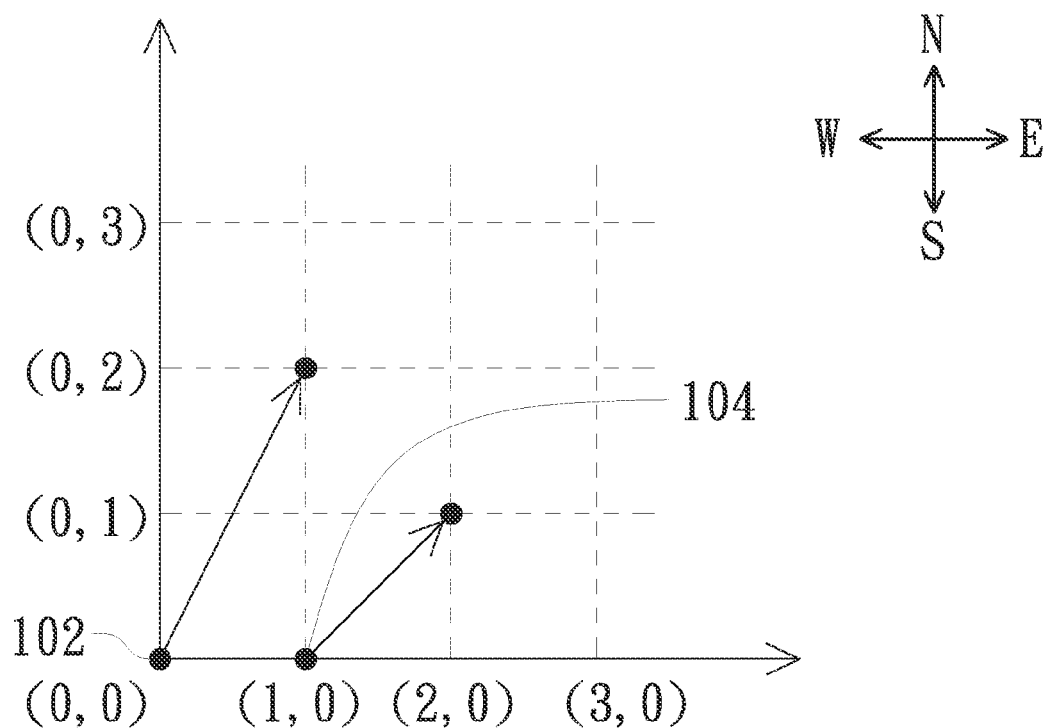
FIG. 1 is a schematic diagram illustrating an operation of a relative position positioning system in accordance with an embodiment of the present invention.

FIG. 1 is a schematic diagram illustrating an operation of a relative position positioning system in accordance with an embodiment of the present invention. As shown, the relative position positioning system in this embodiment includes two apparatuses 102, 104. Each one of the apparatuses 102, 104 is configured to sense a relative position of each other in an initialization period. As illustrated in FIG. 1, for example, originally the apparatus 102 is located at position (0, 0) and the apparatus 104 is located at position (1, 0); and accordingly the apparatus 102 can sense that the apparatus 104 has a relative position of one unit east and the apparatus 104 can sense that the apparatus 102 has a relative position of one unit west in the initialization period.

Then, each one of the apparatuses 102, 104 is configured to measure a displacement itself relative to a plane in an operation period. As illustrated in FIG. 1, for example, the apparatus 102 has a movement from position (0, 0) to position (1, 2) in the operation period; and accordingly the apparatus 102 can measure that it has a displacement of one unit east and two units north in the operation period. Similarly, the apparatus 104 has a movement from position (1, 0) to position (2, 1) in the operation period; and accordingly the apparatus 104 can measure that it has a displacement of one unit east and one unit north in the operation period. In the operation period, once its own displacement is obtained, each one of the apparatuses 102, 104 is further configured to transmit its own displacement to the other through a wireless transmission mean, and then update the relative position of the other according to its own displacement and the received displacement transmitted from the other. Thus, in the operation period, the apparatus 102 can sense that the apparatus 104 has a relative position of one unit east and one unit south and the apparatus 104 can sense that the apparatus 102 has a relative position of one unit west and one unit north.

It is understood that both of the apparatuses 102, 104 may have a continue movement in the operation period; thus, each one of the apparatuses 102, 104 is configured to regularly transmit its own latest measured displacement to the other through the wireless transmission mean in one embodiment. In another embodiment, each one of the apparatuses 102, 104 is configured to irregularly transmit its own latest measured displacement to the other through the wireless transmission mean. However, it is understood that the regular manner is preferred.

Figure 2:
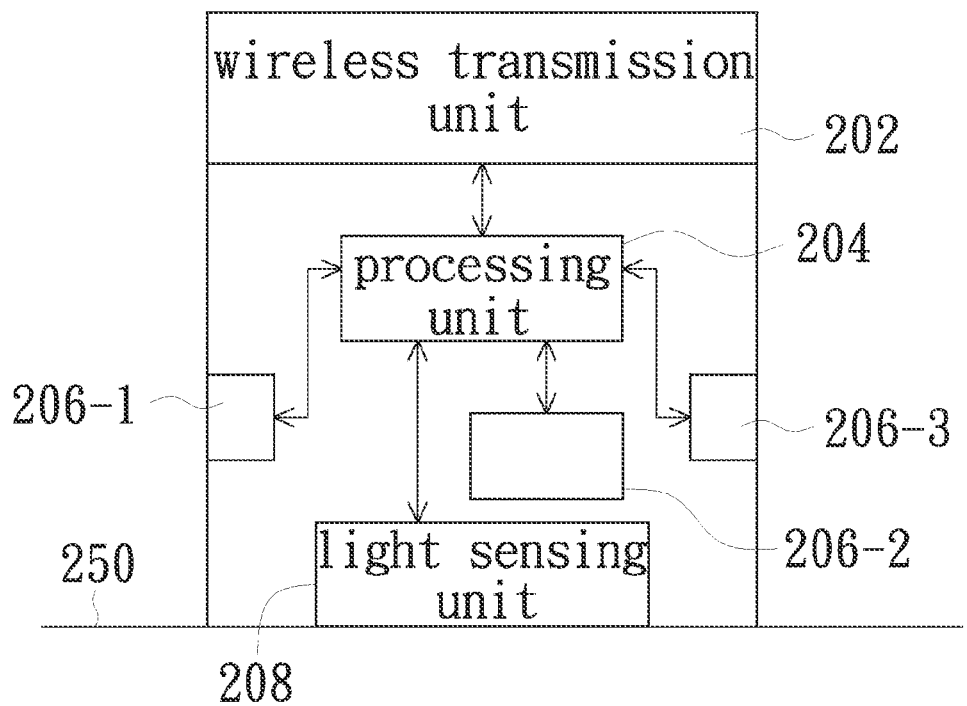
FIG. 2 is a schematic cross-sectional diagram of the apparatus shown in accordance with an embodiment of the present invention.
Figure 3:
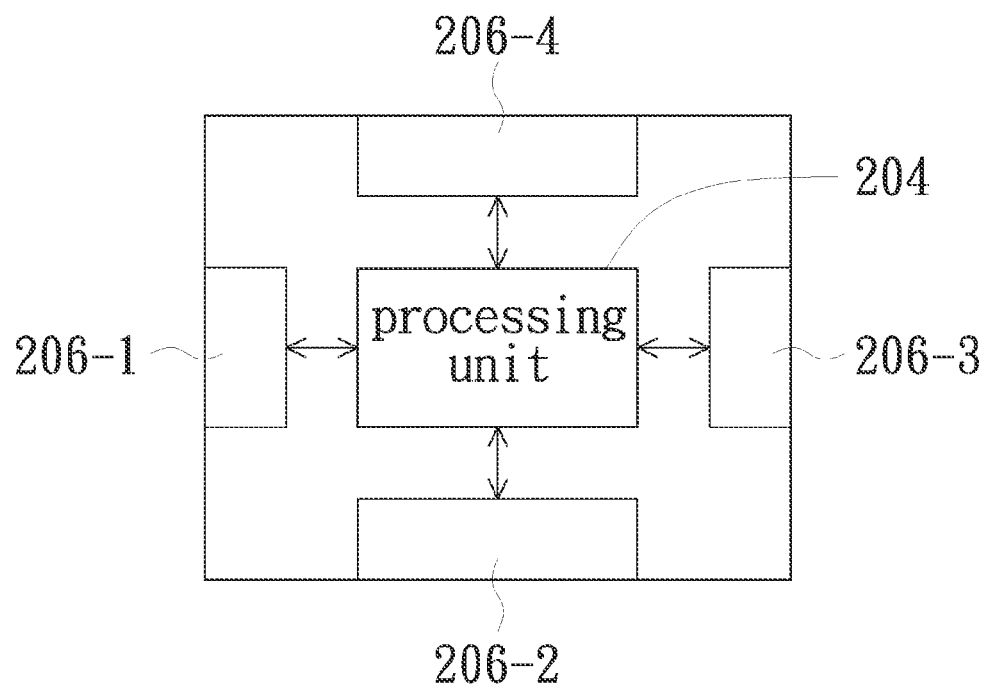
FIG. 3 is a schematic top diagram illustrating the relative position of the processing unit and the four distance measuring units.

FIG. 2 is a schematic cross-sectional diagram of the apparatus shown in accordance with an embodiment of the present invention; but the present invention is not limited thereto. As shown, the apparatus includes a wireless transmission unit 202, a processing unit 204, a distance measuring device consisting of four distance measuring units 206-1~206-4 (the distance measurement unit 206-4 is not shown in FIG. 2 but shown in FIG. 3), and a light sensing unit 208. The processing unit 204 (for example, the one disposed in the apparatus 102) is configured to sense the direction and distance of the apparatus 104 through the respective distance measuring device and accordingly obtain the relative position of the apparatus 104 in the initialization period. FIG. 3 is a schematic top diagram illustrating the relative position of the processing unit 204 and the four distance measuring units 206-1~206-4. As shown, the four distance measuring units 206-1~206-4 are disposed at the four sides of the respective apparatus and electrically coupled to the processing unit 204; wherein the four distance measuring units 206-1~206-4 each can have a signal transmission with the processing unit 204. Specifically, the four distance measuring units 206-1~206-4 are configured to sense the west, south, east and north directions for a distance measuring operation, respectively. It is understood that the relative position of the processing unit 204 and the four distance measuring units 206-1~206-4 illustrated in FIG. 3 is for an exemplary purpose only, and the present invention is not limited thereto.

Please refer to FIG. 2 again. As shown, in the operation period, the processing unit 204 (for example, the one disposed in the apparatus 102) is further configured to sense the plane 250 through a light sensing unit 208, measure the displacement of the apparatus 102 relative to the plane 250 according to the sensed images, and transmit the measured displacement to the apparatus 104. Thus, the apparatus 102 can update the relative position of the apparatus 104 according to its own latest measured displacement and the latest measured displacement of the apparatus 104.

It is understood that the relative position positioning system of the present invention may also apply to three or more apparatuses. For example, if the relative position positioning system includes three apparatuses, the operation of the relative position positioning system may have an exemplary process as follow. First, in the initialization period, each one of the three apparatuses is configured to sense the relative position of the other two apparatuses in the initialization period. Then, in the operation period, each one of the three apparatuses is configured to measure its own displacement relative to a plane, transmit its own measured displacement to the other two apparatuses through a wireless transmission mean, and update the relative position of the other two apparatuses according to its own latest measured displacement and the latest measured displacements of the other two apparatuses.

It is to be noted that the sharing of displacements among three or more apparatuses may be realized by various ways. In one embodiment, for example, if the relative position positioning system of the present invention includes three apparatuses (that is, the first, second and third apparatuses), the operation of the relative position positioning system may have an exemplary process as follow. First, in the initialization period, each one of the first and second apparatuses senses the relative position of the other; and the first apparatus transmits the relative position of the second apparatus to the third apparatus through a wireless transmission mean, and accordingly the third apparatus can determine the relative position of the second apparatus according to the relative position transmitted from the first apparatus. Then, in the operation period, each one of the first, second and third apparatuses measures its own displacement relative to a plane, transmits the measured displacement to the other two apparatuses through a wireless transmission mean, and updates the relative position of the other two apparatuses according to its own latest measured displacement and the latest measured displacements of the other two apparatuses.

In another embodiment, if the relative position positioning system of the present invention includes three apparatuses (that is, the first, second and third apparatuses), the operation of the relative position positioning system may have an exemplary process as follow. First, in the initialization period, each one of the first, second and third apparatuses sense the relative position of the other two apparatuses. Then, in the operation period, each one of the first, second and third apparatuses measures its own displacement relative to a plane; each one of the first and second apparatuses transmits its own measured displacement to the third apparatus through a wireless transmission mean; the third apparatus transmits the displacement of all the three apparatuses to the first and second apparatuses through a wireless transmission mean; and each one of the first, second and third apparatuses updates the relative position of the other two apparatuses according to the latest measured displacements of all the three apparatuses.

In the aforementioned embodiment, each one of the first and second apparatuses (the two configured to first transmit the respective displacements to the third apparatus) includes a distance measuring device, a light sensing unit, a wireless transmission unit and a processing unit, as illustrated in FIG. 2. However, it is to be noted that the processing unit disposed in the first or second apparatus in this embodiment is specifically configured to sense, through the distance measuring device, the direction and distance of the other two apparatuses to obtain the relative position of the other two apparatuses in the initialization period. Then, in the operation period, the processing unit in this embodiment is specifically configured to sense the images of a plane through the light sensing unit, measure a displacement of its own apparatus relative to the plane according to the sensed images, transmit its own displacement to the third apparatus through the wireless transmission unit, and update the relative position of the other two apparatuses according to the latest measured displacements of all the three apparatuses.

In the aforementioned embodiment, the third apparatus (the one configured to receive the displacements from the first and second apparatuses) includes a distance measuring device, a light sensing unit, a wireless transmission unit and a processing unit, as illustrated in FIG. 2. However, it is to be noted that the processing unit disposed in the third apparatus in this embodiment is specifically configured to sense, through the distance measuring device, the direction and distance of the other two apparatuses and accordingly obtain the relative position of the other two apparatuses in the initialization period. Then, in the operation period, the processing unit in this embodiment is specifically configured to sense the images of a plane through the light sensing unit, measure a displacement of its own apparatus relative to the plane according to the sensed images, receives the displacements from the other two apparatuses through the wireless transmission unit, transmit the displacements of all the three apparatuses to the other two apparatuses through the wireless transmission unit, and update the relative position of the other two apparatuses according to the latest measured displacements of all the three apparatuses.

It is understood that all the aforementioned three apparatuses may have continue movements in the operation period; thus, in one embodiment, each one of the three apparatuses is specifically configured to regularly transmit its own latest measured displacement to the other two through the wireless transmission mean. In another embodiment, each one of the three apparatuses is specifically configured to irregularly transmit its own latest measured displacement to the other two through the wireless transmission mean in an irregular manner. However, it is understood that the regular manner is preferred.

In an actual design, the distance measuring unit in each one of the aforementioned embodiments may be implemented by an optical distance measuring unit; and the wireless transmission unit in each one of the aforementioned embodiments may be implemented by a radio frequency unit; however, the present invention is not limited thereto. In addition, based on the operations of the relative position positioning system including two or three apparatuses, it is known that the relative position positioning system of the present invention can also apply to four or more apparatuses by those ordinarily skilled in the art; and no redundant detail is to be given herein.

Figure 4:
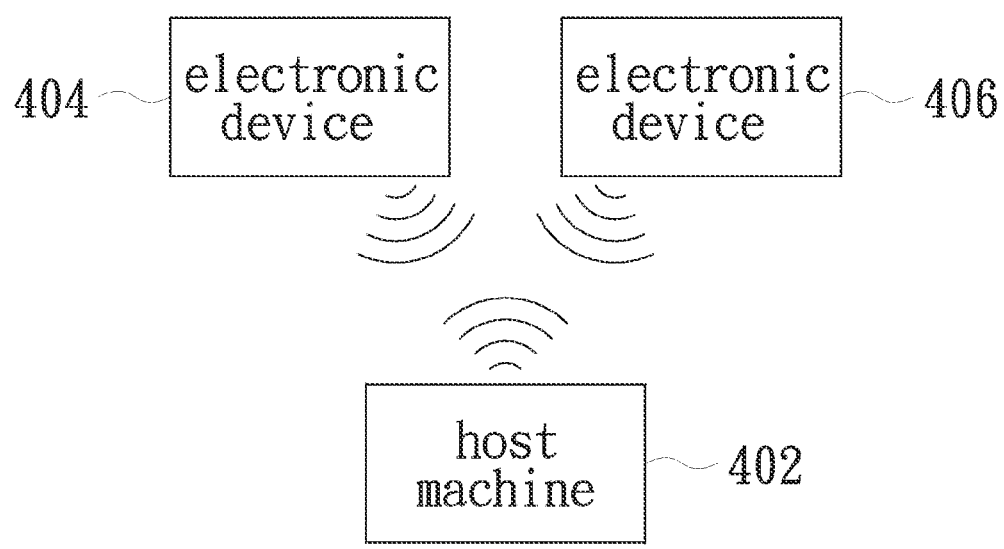
FIG. 4 is a schematic diagram of a tracking system in accordance with an embodiment of the present invention.

Various tracking systems for a plurality of ground vehicles may be developed based on the aforementioned embodiments by those ordinarily skilled in the art. For example, a tracking system without the aforementioned distancing measuring unit may be developed. FIG. 4 is a schematic diagram of a tracking system in accordance with an embodiment of the present invention. As shown, the tracking system in this embodiment includes a host machine 402 and two electronic devices 404, 406. The host machine 402 includes a display screen (not shown) for displaying specific information. Both of the electronic devices 404, 406 may be implemented by the apparatus shown in FIG. 2; wherein the distance measuring units therein are optional. Originally, the electronic device 404 is initially located at the first predetermined position (not shown) and the electronic device 406 is initially located at the second predetermined position (not shown). In an initialization period, both of the electronic devices 404, 406 are configured to transmit the first and second predetermined positions to the host machine 402, respectively, through a wireless transmission mean. In an operation period following the initialization period, each one of the electronic devices 404, 406 is configured to measure its own displacement relative to a plane (not shown) and transmit the measured displacement to the host machine 402. Then, the host machine 402 is configured to dynamically display the positions of the electronic devices 404, 406 according to the latest measured displacements from the electronic devices 404, 406.

Figure 5:
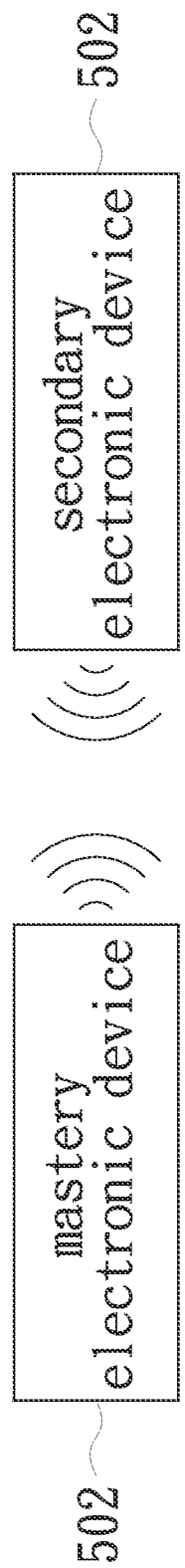
FIG. 5 is a schematic diagram of a tracking system in accordance with another embodiment of the present invention.

FIG. 5 is a schematic diagram of a tracking system in accordance with another embodiment of the present invention. As shown, the tracking system in this embodiment includes a mastery electronic device 502 and a secondary electronic device 504. Both of the mastery electronic device 502 and the secondary electronic device 504 may be implemented by the apparatus shown in FIG. 2; wherein the distance measuring units therein are optional. Both of the mastery electronic device 502 and the secondary electronic device 504 are disposed on a plane (not shown) and have a specific distance therebetween. In an initialization period, the mastery electronic device 502 and the secondary electronic device 504 can communicate with each other through a wireless transmission mean. In an operation period following the initialization period, each one of the mastery electronic device 502 and the secondary electronic device 504 is configured to measure its own displacement relative to the plane. Specifically, the mastery electronic device 502 and the secondary electronic device 504 always maintain the aforementioned distance therebetween while moving.

In order to maintain the specific distance between the mastery electronic device 502 and the secondary electronic device 504, in one embodiment both of the mastery electronic device 502 and the secondary electronic device 504 are further to configured to transmit the respective displacements to each other through a wireless transmission mean when the respective displacements relative to the plane are measured in the operation period. Thus, the secondary electronic device 504 can have a movement following with that of the mastery electronic device 502 based on its own displacement and the received displacement of the mastery electronic device 502, and thereby maintain the specific distance with the mastery electronic device 502.

In order to maintain the specific distance between the mastery electronic device 502 and the secondary electronic device 504, in another embodiment the mastery electronic device 502 is further configured to transmit its own displacement to the secondary electronic device 504 through a wireless transmission mean when the respective displacements relative to the plane are measured in the operation period. Thus, the secondary electronic device 504 can have a movement following with that of the mastery electronic device 502 based on its own displacement and the received displacement of the mastery electronic device 502, and thereby maintain the specific distance with the mastery electronic device 502.

In summary, by first configuring all apparatuses in a relative position positioning system to sense the relative positions with each other and configuring each apparatus to measure its own displacement and then transmit the displacement to all the other apparatuses through a wireless transmission mean, each apparatus in the relative position positioning system of the present invention can obtain the relative position of all other apparatuses. In addition, based on the similar features, each electronic device in the tracking system of the present invention can obtain the relative position of all other electronic devices.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A relative position positioning system, comprising:
   a first apparatus including:
      a first light sensing device, configured to sense a movement of the first apparatus relative to a plane and therefore obtains a plurality of images corresponding to the movement of the first apparatus;
      a first wireless transmission unit; and
      a first processing unit, electrically coupled to the first wireless transmission unit and the first light sensing device and configured to processing the plurality of images obtained by the first light sensing device so as to measure a displacement of the first apparatus relative to the plane; and
   a second apparatus including:
      a second light sensing device, configured to sense a movement of the second apparatus relative to the plane and therefore obtains a plurality of images corresponding to the movement of the second apparatus;
      a second wireless transmission unit; and
      a second processing unit, electrically coupled to the second wireless transmission unit and the second light sensing device and configured to processing the plurality of images obtained by the second light sensing device so as to measure a displacement of the second apparatus relative to the plane;
   wherein each one of the first and second apparatuses transmits its own displacement to the other through the first and second wireless transmission units and accordingly generates a relative position from each other, each one of the first and second apparatuses is configured to sense a relative position of the other in an initialization period, wherein in an operation period, each one of the first and second apparatuses is configured to measure its own displacement relative to a plane, transmit its own measured displacement to the other through a wireless transmission mean, and update the relative position of the other according to its own displacement and the displacement received from the other.

2. The relative position positioning system according to claim 1, wherein the wireless transmission unit is implemented by a radio frequency unit.

3. The relative position positioning system according to claim 1, wherein in an operation period, each one of the first and second apparatuses is configured to regularly transmit its own measured displacement to the other.

4. The relative position positioning system according to claim 1, further comprising a third apparatus, wherein each one of the first, second and third apparatuses is configured to sense a relative position of the other two apparatuses in an initialization period, wherein in an operation period, each one of the first, second and third apparatuses is configured to measure its own displacement relative to the plane, transmit its own measured displacement to the other two apparatuses through the first, second and third wireless transmission units, and update the relative positions of the other two apparatuses according to its own displacement and the displacements received from the other two apparatuses.

5. The relative position positioning system according to claim 1, further comprising a third apparatus, wherein in an initialization period, each one of the second and third apparatuses is configured to sense the relative position of the other, and the second apparatus is configured to transmit the relative position of the first apparatus to the third apparatus through the second wireless transmission unit and accordingly the third apparatus can determine the relative position of the first apparatus, wherein in an operation period, each one of the first, second and third apparatuses is configured to measure its own displacement relative to the plane, transmit its own measured displacement to the other two apparatuses through the first, second and third wireless transmission units, and update the relative positions of the other two apparatuses according to its own displacement and the displacements received from the other two apparatuses.

6. A relative position positioning system, comprising:
   a first apparatus including:
      a first light sensing device, configured to sense a movement of the first apparatus relative to a plane and therefore obtains a plurality of images corresponding to the movement of the first apparatus;
      a first wireless transmission unit; and
      a first processing unit, electrically coupled to the first wireless transmission unit and the first light sensing device and configured to processing the plurality of images obtained by the first light sensing device so as to measure a displacement of the first apparatus relative to the plane;
   a second apparatus including:
      a second light sensing device, configured to sense a movement of the second apparatus relative to the plane and therefore obtains a plurality of images corresponding to the movement of the second apparatus;
      a second wireless transmission unit; and
      a second processing unit, electrically coupled to the second wireless transmission unit and the second light sensing device and configured to processing the plurality of images obtained by the second light sensing device so as to measure a displacement of the second apparatus relative to the plane; and a third apparatus including:
  a third light sensing device, configured to sense a movement of the third apparatus relative to the plane and therefore obtains a plurality of images corresponding to the movement of the third apparatus;
  a third wireless transmission unit; and
  a third processing unit, electrically coupled to the third wireless transmission unit and the third light sensing device and configured to processing the plurality of images obtained by the third light sensing device so as to measure a displacement of the third apparatus relative to the plane;

wherein each one of the first and second apparatuses transmits its own displacement to the third apparatus through the first and second wireless transmission units and thereby the third apparatus transmits the received displacements and its own displacements to the first and second apparatuses through the third wireless transmission unit so that each one of the first, second and third apparatus accordingly generates a relative position from one another, each one of the first and second apparatuses is configured to sense a relative position of the other in an initialization period, wherein in an operation period, each one of the first and second apparatuses is configured to measure its own displacement relative to a plane, transmit its own measured displacement to the other through a wireless transmission mean, and update the relative position of the other according to its own displacement and the displacement received from the other.

7. The relative position positioning system according to claim 6, wherein the first, second and third wireless transmission units are implemented by a radio frequency unit.

8. The relative position positioning system according to claim 6, wherein in an operation period, each one of the first and second apparatuses is configured to regularly transmit its own measured displacement to the third apparatus through the first and second wireless transmission units, and the third apparatus is configured to regularly transmit the displacements of the first, second and third apparatuses to the first and second apparatuses through the third wireless transmission unit.

9. A tracking system, comprising:
a host machine;
a first electronic device including:
  a first light sensing device, configured to sense a movement of the first electronic device relative to a plane and therefore obtains a plurality of images corresponding to the movement of the first electronic device;
  a first wireless transmission unit; and
  a first processing unit, electrically coupled to the first wireless transmission unit and the first light sensing device and configured to processing the plurality of images obtained by the first light sensing device so as to measure a displacement of the first electronic device relative to the plane; and
a second electronic device including:
  a second light sensing device, configured to sense a movement of the second electronic device relative to the plane and therefore obtains a plurality of images corresponding to the movement of the second electronic device;
  a second wireless transmission unit; and
  a second processing unit, electrically coupled to the second wireless transmission unit and the second light sensing device and configured to processing the plurality of images obtained by the second light sensing device so as to measure a displacement of the second electronic device relative to the plane;

wherein each one of the first and second electronic devices transmits its own displacement to the host machine through the first and second wireless transmission units and the host machine accordingly and dynamically represents the positions of the first and second electronic devices, each one of the first and second electronic devices is configured to sense a relative position of the other in an initialization period, wherein in an operation period, each one of the first and second electronic devices is configured to measure its own displacement relative to a plane, transmit its own measured displacement to the other through a wireless transmission mean, and update the relative position of the other according to its own displacement and the displacement received from the other.

10. A tracking system, comprising:
a mastery electronic device being disposed on a plane and including:
  a first light sensing device, configured to sense a movement of the mastery electronic device relative to the plane and therefore obtains a plurality of images corresponding to the movement of the mastery electronic device;
  a first wireless transmission unit; and
  a first processing unit, electrically coupled to the first wireless transmission unit and the first light sensing device and configured to processing the plurality of images obtained by the first light sensing device so as to measure a displacement of the mastery electronic device relative to the plane; and
a secondary electronic device disposed on the plane and having a specific distance from the mastery electronic device, the secondary electronic device including:
  a second light sensing device, configured to sense a movement of the secondary electronic device relative to the plane and therefore obtains a plurality of images corresponding to the movement of the secondary electronic device;
  a second wireless transmission unit; and
  a second processing unit, electrically coupled to the second wireless transmission unit and the second light sensing device and configured to processing the plurality of images obtained by the second light sensing device so as to measure a displacement of the secondary electronic device relative to the plane;

wherein the mastery and secondary electronic devices are configured to communicate with each other through the first and second wireless transmission units and maintain the specific distance according to the measured first and second displacements, each one of the mastery and secondary electronic devices is configured to sense a relative position of the other in an initialization period, wherein in an operation period, each one of the mastery and secondary electronic devices is configured to measure its own displacement relative to a plane, transmit its own measured displacement to the other through a wireless transmission mean, and update the relative position of the other according to its own displacement and the displacement received from the other.

11. The tracking system according to claim 10, wherein the secondary electronic device is further configured to have a movement following the mastery electronic device by maintaining the specific distance with the mastery electronic device according to the measured first and second displacements.

* * * * *